United States Patent
Mesic et al.

(10) Patent No.: US 9,932,708 B2
(45) Date of Patent: Apr. 3, 2018

(54) PROCESS FOR MANUFACTURING A COMPOSITE ARTICLE COMPRISING CELLULOSE PULP FIBERS AND A THERMOPLASTIC MATRIX

(71) Applicant: Södra Skogsägarna Ekonomisk Förening, Växjö (SE)

(72) Inventors: Narcis Mesic, Varberg (SE); Anna Linda Viktoria Friman, Kållered (SE)

(73) Assignee: SÖDRA SKOGSÄGARNA EKONOMISK FÖRENING, Växjö (SE)

( * ) Notice: Subject to any disclaimer, the term of this patent is extended or adjusted under 35 U.S.C. 154(b) by 609 days.

(21) Appl. No.: 14/399,270

(22) PCT Filed: May 10, 2013

(86) PCT No.: PCT/SE2013/050528
§ 371 (c)(1),
(2) Date: Nov. 6, 2014

(87) PCT Pub. No.: WO2013/169204
PCT Pub. Date: Nov. 14, 2013

(65) Prior Publication Data
US 2015/0118431 A1    Apr. 30, 2015

(30) Foreign Application Priority Data

May 11, 2012    (SE) .................................... 1250481-7
May 11, 2012    (SE) .................................... 1250482-5

(51) Int. Cl.
*D21H 11/04*    (2006.01)
*D21H 15/04*    (2006.01)
(Continued)

(52) U.S. Cl.
CPC ............. *D21H 11/04* (2013.01); *B29C 70/12* (2013.01); *B42D 25/29* (2014.10); *C08J 3/005* (2013.01);
(Continued)

(58) Field of Classification Search
CPC .......... D21H 3/10; D21H 13/12; D21H 13/14; D21H 13/20; D21H 13/24; D21H 23/04;
(Continued)

(56) References Cited

U.S. PATENT DOCUMENTS 4,162,180 A * 7/1979 Burton .................. D21H 5/129
                                                156/290
4,655,877 A * 4/1987 Horimoto .............. D21H 5/202
                                                156/62.2
(Continued)

FOREIGN PATENT DOCUMENTS

BE          670968      *  1/1966
EP         1405949         4/2004
(Continued)

OTHER PUBLICATIONS

BE 670968, Jan. 31, 1966; English language machine translation [www.epo.org].*
(Continued)

*Primary Examiner* — Eric Hug
(74) *Attorney, Agent, or Firm* — Ballard Spahr LLP

(57) ABSTRACT

The present invention relates to a process for manufacturing a composite article comprising cellulose pulp fibers and a thermoplastic matrix, wherein said process comprises the steps of: a) mixing a refined aqueous pulp suspension with a water suspension of thermoplastic fibers into a composition, b) forming the composition into a fiber web, c) dewatering the fiber web, d) drying the fiber web, and e) heating and pressing the dried fiber web from step d) to melt said
(Continued)

thermoplastic fibers into a thermoplastic matrix and form a composite article.

20 Claims, 2 Drawing Sheets

(51) Int. Cl.

| | |
|---|---|
| *D21H 13/28* | (2006.01) |
| *C08L 1/02* | (2006.01) |
| *D21H 25/04* | (2006.01) |
| *D21H 27/10* | (2006.01) |
| *D21H 13/24* | (2006.01) |
| *D21H 23/04* | (2006.01) |
| *D21H 13/12* | (2006.01) |
| *D21H 13/14* | (2006.01) |
| *D21H 13/20* | (2006.01) |
| *D21H 21/40* | (2006.01) |
| *B42D 25/29* | (2014.01) |
| *C08J 3/00* | (2006.01) |
| *B29C 70/12* | (2006.01) |
| *C08L 1/08* | (2006.01) |
| *C08L 67/04* | (2006.01) |
| *D21D 1/20* | (2006.01) |
| *B29K 67/00* | (2006.01) |
| *B29K 401/00* | (2006.01) |

(52) U.S. Cl.
CPC .................... *C08L 1/02* (2013.01); *C08L 1/08* (2013.01); *C08L 67/04* (2013.01); *D21D 1/20* (2013.01); *D21H 13/12* (2013.01); *D21H 13/14* (2013.01); *D21H 13/20* (2013.01); *D21H 13/24* (2013.01); *D21H 13/28* (2013.01); *D21H 15/04* (2013.01); *D21H 21/40* (2013.01); *D21H 23/04* (2013.01); *D21H 25/04* (2013.01); *D21H 27/10* (2013.01); *B29K 2067/046* (2013.01); *B29K 2401/00* (2013.01); *B29K 2995/006* (2013.01); *C08J 2301/00* (2013.01); *C08J 2367/04* (2013.01); *C08L 2205/16* (2013.01); *Y10T 428/1397* (2015.01)

(58) Field of Classification Search
CPC ........ D21H 23/16; D21H 25/04; D21H 13/28; D21H 15/04
USPC .................. 162/146, 157.2, 157.3, 157.4
See application file for complete search history.

(56) References Cited

U.S. PATENT DOCUMENTS

| | | | | |
|---|---|---|---|---|
| 4,769,109 A | * | 9/1988 | Tellvik ............... | B29C 51/145 162/123 |
| 4,769,274 A | * | 9/1988 | Tellvik ............... | B29C 51/145 156/245 |
| 5,223,095 A | * | 6/1993 | Kinsley, Jr. ......... | B24D 3/002 162/146 |
| 5,387,319 A | * | 2/1995 | Mora .................. | D21H 11/18 162/146 |
| 8,870,109 B2 | | 10/2014 | Ghibellini et al. | |
| 2009/0288791 A1 | * | 11/2009 | Hammer ............ | A22C 13/0013 162/146 |
| 2010/0193116 A1 | * | 8/2010 | Gamstedt ........... | D21H 13/12 156/246 |

FOREIGN PATENT DOCUMENTS

| | | |
|---|---|---|
| JP | H06346399 | 12/1994 |
| JP | 3358000 | 12/2002 |
| JP | 2003342891 | 12/2003 |
| JP | 4035376 | 1/2008 |
| KR | 20090099298 | 9/2009 |
| KR | 101005108 | 12/2010 |
| WO | WO 1992/005311 | 4/1992 |
| WO | WO 2009/008822 | 1/2009 |
| WO | WO 2013/169203 | 11/2013 |

OTHER PUBLICATIONS

Papiermacher Taschenbuch, Mar. 2003, pp. 4-5, 60-63, 70-71.*
Papiermacher Taschenbuch, Mar. 2003, pp. 60-62, 71, English language machine translation [www.google.com].*
Fybrel Synthetic Fiber, Crown Zellerbach, Sep. 1978.*
Opposition against European Patent No. 2847382, Valea Technology & Law, Jan. 8, 2018 [retrieved at www.epo.org].*
U.S. Appl. No. 14/399,292, filed Nov. 6, 2014, Narcis Mesic.
Spinu, M. et al., How Does the Never-Dried State Influence the Swelling and Dissolution of Cellulose Fibres in Aqueous Solvent?, Cellulose, 18(2): 247-56 (2011).
Gong et al. Jan. 2012. "Novel blend of biorenewable wet-end paper agents." Tappi Journal, vol. 11, No. 1. pp. 41-48.
Hasan et al. 2010. "Strength properties of kraft pulp produced from hot-water extracted woodchips within the biorefinery." Journal of Biobased Materials and Bioenergy, vol. 4. pp. 46-52.
Larsson et al. 2012. "Polylactide latex/nanofilbrillated cellulose bionanocomposites of high nanofibrillated cellulose content and nanopaper network structure prepared by a papermaking route." Journal of Applied Polymer Science, vol. 125. pp. 2460-2466.
Wang et al. 2007. "The effect of chemically coated nanofiber reinforcement on biopolymer based nanocoposites." in: BioResources. vol. 2, No. 3. pp. 371-388.
International Preliminary Report on Patentability dated Jul. 17, 2014 for International Application No. PCT/SE2013/050528, which was filed on May 10, 2013 and published as WO 2013/169204 on Nov. 14, 2013. (Inventor—Narcis Mesic; Applicant—Södra Cell AB) (pp. 1-16).
International Search Report dated Sep. 2, 2013 for International Application No. PCT/SE2013/050528, which was filed on May 10, 2013 and published as WO 2013/169204 on Nov. 14, 2013. (Inventor—Narcis Mesic; Applicant—Södra Cell AB). (pp. 1-5).
International-Type Search Report dated Nov. 27, 2012 for International Application No. PCT/SE2013/050528, which was filed on May 10, 2013 and published as WO 2013/169204 on Nov. 14, 2013. (Inventor—Narcis Mesic; Applicant—Södra Cell AB). (pp. 1-5).
International Preliminary Report on Patentability dated Jun. 30, 2014 for International Application No. PCT/SE2013/050527, which was filed on May 10, 2013 and published as WO 2013/169203 on Nov. 14, 2013. (Inventor—Narcis Mesic; Applicant—Södra Cell AB). (pp. 1-13).
International Search Report dated Sep. 2, 2013 for International Application No. PCT/SE2013/050527, which was filed on May 10, 2013 and published as WO 2013/169203 on Nov. 14, 2013. (Inventor—Narcis Mesic; Applicant—Södra Cell AB). (pp. 1-5).
International-Type Search Report dated Nov. 27, 2012 for International Application No. PCT/SE2013/050527, which was filed on May 10, 2013 and published as WO 2013/169203 on Nov. 14, 2013. (Inventor—Narcis Mesic; Applicant—Södra Cell AB). (pp. 1-5).

* cited by examiner

| PLA % | Refining | Density kg/m3 | Tensile index Nm/g | Tear index mNm2/g | Stretch % | Air permeability µm/Pa s | Z-strength kPa | Formation | Wet strenght Nm/g | TEA kJ/kg | TSI MNm/kg | Fold log 10 |
|---|---|---|---|---|---|---|---|---|---|---|---|---|
| 10 | Pulp mill | 605 | 57 | 15 | 5,2 | 31 | 775 | 6,9 | 10 | 2100 | 5,2 | 2,3 |
|  | Paper mill | 660 | 71 | 14 | 4,3 | 10 | 735 | 7,3 | 2 | 2150 | 6,3 | 3 |
| 30 | Pulp mill | 620 | 59 | 10 | 3,7 | 75 | 770 | 8 | 21 | 1500 | 5,5 | 1,7 |
|  | Paper mill | 640 | 64 | 9 | 2,8 | 15 | 730 | 9,5 | 12 | 1340 | 6,3 | 2,7 |
| 50 | Pulp mill | 705 | 51 | 5,4 | 2,7 | 190 | 680 | 9 | 33 | 900 | 4,6 | 1 |
|  | Paper mill | 685 | 48 | 5,4 | 1,6 | 24 | 630 | 11,5 | 21 | 500 | 5,2 | 2 |

*Fig. 4*

| Sample | PLA fiber | Air permeability (µm/Pas) | Density (kg/m³) |
|---|---|---|---|
| 1 | Crimped | 237 | 385 |
| 2 | Non-crimped | 212 | 394 |

*Fig. 5*

PROCESS FOR MANUFACTURING A COMPOSITE ARTICLE COMPRISING CELLULOSE PULP FIBERS AND A THERMOPLASTIC MATRIX

CROSS-REFERENCE TO RELATED APPLICATIONS

This application is a National Phase Application of International Application No. PCT/SE2013/050528, filed on May 10, 2013, which claims priority to Swedish Patent Application No. 1250481-7, filed May 11, 2012; and Swedish Patent Application No. 1250482-5, filed May 11, 2012, each of which are hereby incorporated by reference in their entirety.

TECHNICAL FIELD

The present invention relates to a process for manufacturing a composite article comprising cellulose pulp fibers and a thermoplastic matrix. Further, the invention relates to composite articles comprising cellulose pulp fibers and a thermoplastic matrix produced in said process and products comprising such composite articles. The composite article may be a paper such as a paper sheet. The thermoplastic fibers may be polylactic fibers.

BACKGROUND

Polymers from renewable resources have attracted an increasing amount of attention over the last two decades mainly due to two reasons: environmental concerns and the limitations of the petroleum resources. Like most polymers from petroleum feed stock, polymers from renewable resources are rarely used as functional materials in a pure state. Instead, composites comprising the polymers from renewable resources are often used to improve specific properties.

Cellulose fibers are widely used in polymeric materials to improve the mechanical properties of composite materials. Cellulose is the major substance obtained from vegetable fibers, and applications for cellulose fiber-reinforced polymers are at the forefront with a focus on renewable raw materials.

The development of synthetic polymers using monomers from natural resources provides a new direction to develop environmentally friendly biodegradable polymers from renewable sources. One of the most promising polymers in this regard is polylactic acid (PLA), because it can be made from agricultural products and is readily biodegradable.

The usual objective for preparing novel blends of two or more polymers is not to change the properties of the polymers drastically, but to capitalize on the maximum possible performance of the blend.

The use of PLA matrix reinforced with various cellulose fibers has been widely reported. The cellulose fibers have successfully improved modulus and tensile strength of the PLA matrix. However, the poor interface between hydrophobic PLA and hydrophilic cellulose fibers results in poor mechanical properties. In order to improve the interface between the PLA fibers and the cellulose-based fibers, various surface treatments have been developed, such as esterification, alkali treatment, and cyanoethylation. However, it is still a problem to produce a homogenous mixture of cellulose fibers and PLA fibers. This is especially true when manufacturing paper with high amount of bio-fiber as long bio-fibers tend to create bundles and fiber flocks. Furthermore, the strength of the cellulose will usually be reduced when mixing a biopolymer, such as PLA, with cellulose fibers. The lack of homogeneity deteriorates the structure of the obtained product and produces products with uneven properties. Therefore, it is highly important to obtain a mixture of cellulose and bio-fibers that is as homogeneous as possible. Homogeneity may be improved by using a suspension of short cellulose fibers. However, the drawback of using a suspension of short cellulose fibers is that the mechanical properties such as tear strength of the resulting material are deteriorated.

One way to increase the homogeneity of a composition as disclosed above is to add e.g. lubricants and/or surfactants to the fiber suspension. The lubricant and/or surfactants will reduce the friction between fibers and thereby reduce formation of large fiber flocks. However, the addition of lubricants and/or surfactants tend to create problems with foaming. Further methods relate to changing the surface of the cellulose fibers. However, these solutions do not fully solve the problem of providing suitable composite articles such as paper sheets comprising thermoplastic fibers such as PLA fibers and cellulose fibers having good formation, controlled air permeability, good fold and tear index when converted into different products.

WO 2009008822 discloses processes for manufacturing a composite material having reduced mechanosorptive creep. However, the process disclosed does not overcome the problem with providing homogeneity.

It is an object of the present invention to provide a process for manufacturing a composite article such as a paper sheet comprising cellulose pulp fibers and thermoplastic fibers in which the above-mentioned problems are at least partly overcome or mitigated. Further, it is an object of the invention to provide composite articles and products comprising such composite articles that overcome or mitigate the above-mentioned problems. The thermoplastic fibers may be PLA fibers.

SUMMARY OF THE INVENTION

The present invention relates to a process for manufacturing a composite article comprising cellulose pulp fibers and a thermoplastic matrix, wherein said process comprises the steps of:
a) mixing a refined wet pulp with a water suspension of thermoplastic fibers into a composition,
b) forming the composition into a fiber web,
c) dewatering the fiber web,
d) drying the fiber web, and
e) heating and pressing the dried fiber web from step d) to melt said thermoplastic fibers into a thermoplastic matrix and form a composite article.

The wet pulp may be an aqueous pulp suspension.

The process steps of the above-mentioned process may performed in a different order. Further, the process may comprise additional steps.

Accordingly, the present invention also relates to a process for manufacturing a composite article comprising cellulose pulp fibers and a thermoplastic matrix, wherein said process comprises the steps of:
a) mixing a refined wet pulp with a water suspension of thermoplastic fibers into a composition,
b) dewatering the composition into an intermediate composite article,
c) drying the intermediate composite article,
d) suspending the intermediate composite article in water,
e) forming the intermediate composite article obtained from step d) into a fiber web and drying said fiber web, and f) heating and pressing the fiber web from step e) to melt said thermoplastic fibers into a thermoplastic matrix and form a composite article.

The wet pulp may be an aqueous pulp suspension. The process may further comprise a refining step d") between step d) and step e).

In addition, the present invention relates to a process for manufacturing a composite article comprising cellulose pulp fibers and a thermoplastic matrix wherein said process comprises the steps of:

mixing a refined wet pulp with a water suspension of thermoplastic fibers into a composition, dewatering the composition into an intermediate composite article, and drying the intermediate composite article, wherein said process comprises the steps of:

a) suspending the dried intermediate composite article in water;

b) forming the intermediate composite article obtained from step a) into a fiber web and drying said fiber web, and c) heating and pressing the fiber web from step b) to melt said thermoplastic fibers into a thermoplastic matrix and form a composite article.

The process may further comprise a refining step between step a) and step b).

In the processes described herein, the pressing of the fiber web may take place using a pressure from 50 to 1300 N/cm$^2$, such as from 100 to 500 N/cm$^2$ or from 200 to 300 N/cm$^2$. The time for pressing may vary from 1 to 30 minutes, such as from 2 to 15 minutes or from 5 to 7 minutes.

It has surprisingly been found that the above-mentioned problems are avoided by refining the cellulose pulp fibers and subsequently mixing the refined cellulose pulp fibers in a wet state with an aqueous suspension of thermoplastic fibers. Thus, the refined cellulose pulp fibers as well as the thermoplastic fibers are in a wet state when being mixed together. The thermoplastic fibers are not refined, i.e. they are non-refined thermoplastic fibers. The cellulose pulp fibers are refined to the desired extent prior to being mixed with the thermoplastic fibers. In this way, the desired shape and/or properties of the cellulose pulp fibers such as fiber length, disentanglement, mechanical strength, tensile index, and strain may be obtained without affecting the thermoplastic fibers. This is a significant benefit since thermoplastic fibers may be affected in an undesired way by refining. For instance, refining of thermoplastic fibers may lead to fiber shortening, fiber surface modification, melting, formation of lumps and/or clogging. In particular, coated thermoplastic fibers may lose all or part of their coating during refining thereby changing the fiber properties and behavior in the dispersion resulting from mixing the refined cellulose pulp fibers in a wet state with the aqueous suspension of thermoplastic fibers.

A further advantage of the process described herein is that it allows for use of crimped as well as straight, i.e. non-crimped, thermoplastic fibers such as PLA fibers. Since crimped thermoplastic fibers are handled as bales they are preferred to use on an industrial scale compared to straight thermoplastic fibers that are supplied in bags. When making, for instance, a paper sheet non-crimped fibers would be expected to be spread out in a different manner compared to crimped fibers thereby affecting the mechanical properties of the produced paper sheet. Unexpectedly, the inventors of the present invention have found that the mechanical properties of the paper sheets resulting from the process described herein exhibit essentially the same mechanical properties when using crimped and non-crimped thermoplastic fibers, respectively.

In addition, upon heating the dried fiber web in the process described herein the thermoplastic fibers are melted so that a thermoplastic matrix is formed. Heating and pressing have been found to yield a composite article such as a paper sheet that has excellent formation, air permeability and mechanical properties. The heating may take place at a temperature that is equal to or above the melting temperature of the thermoplastic fibers. It will be appreciated that in the process described herein the thermoplastic fibers are substantially melted and cannot be recovered as the original fibers. In other words, the composite articles such as paper sheets, incorporating the substantially melted thermoplastic fibers, cannot be recycled using ordinary paper manufacturing technology.

The temperature used for forming a thermoplastic matrix by heating the obtained paper web in the process described herein varies depending on the thermoplastic fibers used. Generally, the temperature should be 2° C. to 40° C. higher than the melting temperature of the selected thermoplastic polymer, more preferably 5° C. to 20° C. higher than the melting temperature of the selected thermoplastic fiber. For instance, when PLA fibers are used, having a $T_m$ of 170° C., the temperature may be equal to or above 172° C., such as from 175 to 210° C. When polyethylene fibers are used, exemplified by a $T_m$ of 120° C., the temperature may be equal to or above 122° C., such as from 125 to 160° C. When polypropylene fibers are used, exemplified by a $T_m$ of 130° C., the temperature may be equal to or above 132° C., such as from 135 to 170° C. When polyhydroxybutyrate fibers are used, exemplified by a $T_m$ of 170° C., the temperature may be equal to or above 172° C., such as from 175 to 210° C. However, the skilled person will appreciate that the melting temperature of the thermoplastic fibers may be affected by parameters such as purity, degree of crystallinity, particle size etc which will have to be taken into account when selecting the appropriate temperature for forming the thermoplastic matrix upon heating the fiber web in the process described herein. As used herein, $T_m$ means melting temperature.

Refining of the pulp comprising the cellulose pulp fibers may be performed using conventional refiners such as, but not limited thereto, cone refiners, disc refiners and cylindrical refiners. The refining may be performed using an energy input from 60 to 300 kWh/ton, such as from 80 to 110 kWh/ton, such as 100 kWh/ton. The refining may be performed in a temperature range from 60 to 90° C. Further, the refining may be performed at a specific edge load, i.e. the amount of energy (Joule) applied across one meter of the plate of the refiner, of from 1 to 5 J/m.

The cellulose pulp fibers may be obtained from bleached or unbleached pulp. The pulp may be wood pulp or pulp from plants such as cotton, hemp and bamboo. Thus, the cellulose pulp fibers may be cellulose wood pulp fibers. Said pulp may be obtained directly from a pulp mill, or it may be never-dried pulp from a pulping line, as well as dried pulp. The never-dried pulp may be never-dried softwood pulp. The never-dried pulp may also be never-dried softwood kraft pulp. Use of never-dried pulp offers advantages such as reduced energy requirement and reduced cost. The pulp may be manufactured from pulp processes known to the skilled person.

The cellulose pulp fibers in the composition as defined herein may have a length from 0.5 to 4 mm, such as from 1 to 3 mm, such as from 2 to 3 mm. Further, the cellulose pulp fibers may be chemically modified by using a chemical compound, such as but not limited to, for example, CMC (carboxymethyl cellulose). The CMC may additionally reduce the friction and improve dispersion of the fibers.

The refined cellulose pulp fibers to be mixed with the thermoplastic fibers are in a wet state, i.e. they are mixed with water. As used herein, cellulose pulp fibers in a wet state are denominated wet pulp. The wet pulp may be a pulp suspension or a pulp slurry.

The cellulose pulp fibers may be comprised in a pulp suspension, i.e. an aqueous suspension comprising from 2 to 30 weight % of cellulose pulp fibers. The pulp suspension may be obtained by adding water or white water to the cellulose pulp fibers. The pulp suspension may have a concentration of 4 weight % or less, such as from 0.1 to 4 weight %, such as from 1 to 4 weight %, such as from 3 to 4 weight %, such as below 3.5 weight %, such as from 2 to 4 weight %.

Alternatively, the cellulose pulp fibers may be comprised in a pulp slurry, i.e. a pulp comprising 35-50 weight % cellulose pulp fibers in water.

Prior to mixing the thermoplastic fibers with the refined wet pulp, the thermoplastic fibers are suspended in water. The water may have a temperature of 70° C. or lower, such as 60° C., such as 50° C. The obtained suspension may have a concentration from 2 to 5 weight %, such as 3.5 weight % based on the thermoplastic fibers. The handling of the thermoplastic fibers is greatly facilitated by suspending the thermoplastic fibers in water and using the resulting aqueous suspension of thermoplastic fibers for mixing with the wet pulp. In addition, mixing the aqueous suspension of thermoplastic fibers with the wet pulp affords a homogeneous suspension. This is in contrast to using dry thermoplastic fibers which leads to an inhomogeneous mixture in which there are bundles of fibers.

In the process described herein the aqueous suspension of thermoplastic fibers may have a concentration of 2 to 5 weight % such as from 3 to 4 weight % or approximately 3.5 weight %.

Furthermore, the thermoplastic fibers such as PLA fibers may be coated with a coating.

The coating may comprise a non-ionic polymer and/or an anionic polymer and/or a cationic polymer and/or a lubricant. The homogeneity of the composite article obtained by the process described herein may be enhanced by coating the thermoplastic fibers with the coating. The coating may enable separation of the cellulose fibers and the thermoplastic fibers and thereby reduce the agglomeration of the fibers. The coating may also be referred to as finish composition or finish.

The coating may comprise from 40 to 60 weight % of lubricant and/or surfactant, from 15 to 35 weight % of anionic polymer and from 10 to 25 weight % of non-ionic polymer. The coating may also comprise from 1 to 5 weight % of a biocide, an antioxidant, an anti-friction agent and/or a viscosity regulation agent. The lubricant and/or surfactant may be selected from waxes, such as synthetic waxes, esters, such as butyl stearate, ethoxylated esters, ethoxylated fatty acids, ethoxylated fatty acids and polyethers. The anionic polymer may be selected from a anionic tenside, such as an anti-static agent, such as alkyl acid phosphates and their salts, ethoxylated derivatives of the before mentioned substances, phosphate ethoxylated of fatty acids and alcohols, organic sulfates and sulfonates. The non-ionic polymer may be selected for non-ionic tensides, such as emulsifiers such as polyglycols, polyglycol esters and ethers, glyceryl fatty acid esters, ethoxylated alcohols, fatty acids, fatty amides, alkyl phenols or derivatives thereof. The selection of each component comprised in the coating depends on the use of the composition as defined herein, for example if the composition is to be used for a food application in the US then components approved by the Food and Drug Administration (FDA) should be selected.

The amount of coating in relation to the amount of the thermoplastic fibers may range from 0.19 to 0.5 weight %, such as from 0.25 to 0.45 weight %, such as from 0.30 to 0.40 weight %. Further, the coating may not have to coat the whole thermoplastic fiber, i.e. the thermoplastic fibers may be partially coated. Furthermore, the fibers may not have to be coated with the same coating and therefore the total amount of thermoplastic fibers may comprise thermoplastic fibers having different composition of the coatings. Also, not all of the thermoplastic fibers may be coated with the coating as defined hereinabove or hereinafter, for example, but not limited to, 80% or more of the thermoplastic fibers may be coated, such as from 80 to 99% of the thermoplastic fibers may be coated. The thermoplastic fibers may be coated with one, two or more layers of coating. As mentioned previously, the thermoplastic fibers may be PLA fibers.

There are different processes available for applying a coating to the thermoplastic fibers such as PLA fibers. One of the most common processes used comprises drawing the fiber over a roller, which in turn rotates in a bath comprising the coating. The amount of applied coating is determined by the speed of the roller, the viscosity of the coating and of the wetting potential of the coating. Additives may be added to the melt of the thermoplastic such as a PLA melt when manufacturing the PLA fibers. An example of such an additive is ethylene bis-steramide (EBS) that may be added in an amount of from 0.1 to 0.5%. EBS contributes to making the fibers soft and flexible and also reduces metal adhesion.

The thermoplastic fibers may be selected from fibers of polyolefins, polyesters, polycarbonates, polyvinyls, copolymers thereof; and mixtures thereof. The polyolefin may be selected from polyethylene and polypropylene. The polyester may be selected from polyhydroxybutyrat (PHB) and PLA.

The thermoplastic fibers may be selected from fibers made of polyethylene (including LDPE, LLDPE, MDPE, HDPE), polypropylene, polyhydroxybutyrat (PHB) and PLA and copolymers or mixtures thereof.

Preferably, the thermoplastic fibers are PLA fibers. The PLA fibers may be coated with a coating as described herein.

The thermoplastic fibers such as PLA fibers of the composition or composite article as described herein may have a length of from 1 to 6 mm. Further, the thermoplastic fibers such as PLA fibers may have a dtex of from 0.5 to 2.0, such as from 0.9 to 1.7, such as 1.5 to 1.7. The thermoplastic fibers such as PLA fibers may have a crimp angle of 98° or more, such as up to 180°. According to the present invention, the PLA fibers may have a crimp number of from 1 to 7 crimp/cm, such as from 1 to 4 crimp/cm. Contrary to expectation, in the process described herein crimped thermoplastic fibers were found to provide composite articles such as paper sheets having substantially the same properties with respect to, for instance, air permeability and density as when non-crimped thermoplastic fibers were used. The degree of crystallinity of the thermoplastic fibers such as PLA fibers may vary. For example, the thermoplastic fibers such as PLA fibers may have a crystallinity of 40%. The degree of crystallinity will depend on the intended use of the composition as defined herein.

The dewatering may be performed using a press such as, but not limited thereto, a roll press or a shoe press. Also, the dewatering may be performed using several consecutive presses, such as two or more presses. The paper sheet having undergone dewatering may have a water content from 30-70 weight %, such as from 40 to 65 weight %.

The drying may be performed using a flash drier or sheet drier. The composite article such as a paper sheet having undergone drying may have a water content from 1 to 30 weight % such as from 5 to 20 weight %.

The process described herein provides composite articles comprising cellulose pulp fibers and a thermoplastic matrix. It has been found that composite articles produced in accordance with the process described herein have excellent properties with regard to tear index, tensile stiffness, controlled air permeability and formation. The composite article may be a paper or a paper sheet. The measurement of formation is described below.

The composite article may comprise multiple layers which are heat pressed together to form a solid object.

There is also provided a product comprising one or more composite articles obtainable by the process described herein.

Several composite articles such as paper sheets obtainable by the process described herein may be put together and heat pressed to form a product in the form of a solid object.

The composition and/or composite article as defined herein may comprise 70 weight % or less of thermoplastic fibers such as polylactide fibers, such as from 5 to 50 weight %.

The invention also relates to a composite article comprising cellulose pulp fibers and a thermoplastic matrix obtainable by the method described herein as well as a product comprising one or more such composite articles. The thermoplastic matrix may comprise polylactide (PLA).

The composite article comprising cellulose pulp fibers and a thermoplastic matrix such as a PLA matrix may be characterized in that said sheet has a formation from 6 to 14, such as from 7 to 10, and an air permeability of from 10 to 250 μm/Pas, such as from 20 to 250 μm/Pas, such as from 20 to 100 μm/Pas, wet strength equal to or above 2 Nm/g, such as from 2 to 60 Nm/g, from 2 to 50 Nm/g or from 3 to 50 Nm/g and a tensile index of from 40-100 Nm/g, such as from 48 to 95 Nm/g, such as from 60 to 80 Nm/g.

Formation such as paper formation is an important property as this property will influence the print quality and other properties such as strength, opacity and smoothness influence print quality. The lower the formation value is, the more controlled is the air permeability, and the better are the tensile index and the wet strength.

The composite article described herein may comprise from 5 to 70 weight % of a thermoplastic matrix, such as from 10 to 30 weight % of a thermoplastic matrix. The thermoplastic matrix may be a PLA matrix. Also, said cellulose pulp fibers may have a length of from 0.5 to 4.

There is also provided the use of a composite article produced in accordance with the process described herein for manufacturing a label, a billboard, a paper board, a fiber board, furniture, a container, a laminate, a package and a composite.

There is also providing a product such a container or packaging comprising one or more composite articles as described herein. The container or packaging may be used for food. The food container and food packaging exhibit excellent formation, printability and mechanical properties. It also exhibits low air permeability as well as excellent wet strength.

The composite articles such as paper sheets comprising a thermoplastic matrix and cellulose pulp fibers described herein may be put in a stack before manufactured into an article such as a packaging. Also, the skilled person is aware that other components may be added before said composite articles are manufactured to one of the different products mentioned above.

Measurement of Formation

Formation is the distribution of fiber within the plane of the sheet, i.e. the small scale variation of the mass distribution within the plane of a sheet of paper. Formation number, herein also called formation, is the generally accepted quantitative index of formation and is the coefficient of variation of local grammage, i.e. the ratio of the standard deviation to the sheet average grammage. The formation was measured accordingly:

A radiogram image was generated by exposing a sample sheet to a beta source (C-14) and recording the radiation transmitted through the sheet with an image plate. A scanned digital grey scale image was transferred to the actual grammage map by using calibration strip with known grammage levels along one side of the sample. Formation analysis was performed from grammage map. Analysis presented the formation numbers.

The equipment used:
Radiation source: C-14, size at least 120 mm×120 mm, typically activity 750 MBq
Calibration frame: 3-8 stripes, which basis weight are known
Scanner: Fujifilm IP reader with IP eraser or similar.
Imaging plates (IP): Fujifilm BAS-IP MS-type or similar
Software: MatLab evaluation tools The procedure was performed accordingly:
Basis weight of the sample was measured and the samples are stored over-night for conditioning. The samples were weighed and the grammage was calculated in g/m².

The image plate had to be erased before use. Erasure time was at least 20 min. The measurement plate was also erased at least 1 min.

To obtain the same exposure of the image plate, independent of the basis weight of the sample, the exposure time had to change by following equation:

$$\text{Exposure time} = Ae^{\mu B} \quad (1)$$

where A is a constant depending the intensity of the radioactive source, μ is the absorption coefficient: typical 0.031 and B is the average basis weight of the sample.

The unit for the exposure of each pixel in the scanner had the unit PSL, which is an internal unit for the Fuji equipment. The PSL level was coupled to the mean grey level of the image of the paper on the exposed plate. The PSL level was shown by the evaluation programs.

Constant A from equation (1) is fixed to PSL level 30. To find out the coefficient A which had to be calibrated for each exposure system according to the following procedure:
 Set A to 5: in the formula: (1).
 Take a paper sample and measure the basis weight and calculate the exposure time.
 Make the exposure on the paper sample with the calculated time. If the PSL shown in the evaluation program becomes 35 then the A=5*30/35 for this exposure equipment.

There are two levels PSL levels in the standard:
High level: PSL=30
Low level: PSL=10
PSL=30 is recommended when high accuracy is important PSL=10 could be used when the time used for the analysis is important. PSL=10 gives a slightly noisier result. The exposure time for PSL=10 is ⅓ of the time calculated for PSL=30

The sample was put between image plate and C-14 radiation source. After exposing the samples, image plate was read in Fuji scanner within ½ hour ending of the exposure. Spatial resolution was set to 100 µm. When the exposure time had elapsed, the exposure was stopped automatically by the exposure unit. However, the image plate was scanned within half an hour after the exposure had ended. The image plate was placed in the scanner, which scanned the exposed image to the computer.

By exposing the image plate without sample to PSL level 30, background profile (3D shape) was obtained. Smoothing the background profile and using it to correct all the images, provided more accurate results.

Basis weight calibration to grey scale image was performed by using known grammage strips along the one side of the sample (example mylar film).

The formation parameters was calculated from basis weight image.

DEFINITIONS

The term thermoplastic fibers refers to polymer based fibers where the polymer may have a renewable or non-renewable origin. The fibers are characterized by obtaining a melting point upon heating. Examples of thermoplastic fibers include polyolefins, polyesters, polycarbonates, polyvinyls and copolymers and mixtures thereof.

In the present context, the term "polylactic acid", also known as polylactide or PLA, which is a thermoplastic aliphatic polyester, is intended to also include poly-L-lactide (PLLA), poly-D-lactide (PDLA) and poly(L-lactide-co-D, L-lactide) (PLDLLA).

The term "cellulosic fiber" is herein intended to include fibers from any plant and plant-based material. Example of such fibers but not limited thereto are wood, cotton, hemp and bamboo. Example of wood fibers, but not limited thereto, are fibers from pine, spruce, birch and eucalyptus. Examples of manufacturing methods include chemical pulping, CTMP, TMP, soda cooking and organosolv.

The term "formation" as used herein is intended to mean the distribution of fiber within the plane of a sheet and may refer to the transmission of visible light (optical formation) or β-radiation (paper formation).

The term homogeneity may refer to the degree of evenness of a composite article such as a paper sheet and may be characterized by a by a formation number where a low number for formation means better homogeneity.

The term "crimp" is intended to mean the waviness of a fiber, i.e. the condition in which the axis of a fiber under minimum external stress departs from a straight line and follows a simple or a complex or an irregular wavy path.

The term "crimp angle" is intended to mean the angle α between the leg of a crimp wave and the zero line may be used to characterize crimp geometry. The crimp angle is the angle between the two legs of a crimp bow and indicates the sharpness of a crimp.

The term "crimp number", which is also called crimp frequency or crimp count characterizes the number of crimp bows or waves per length of straightened fiber.

The ability of paper products to maintain a substantial proportion of their original strength after being completely saturated with aqueous solution is known as wet strength.

The term "matrix", such as in the context of the expressions "a thermoplastic matrix" or "a PLA matrix", also referred to as resin solution, is intended to refer to the continuous phase of a thermoplastic polymer.

BRIEF DESCRIPTION OF THE DRAWINGS

The processes disclosed herein will be described in more detail with reference to the appended drawing wherein:

FIG. 4 shows the properties of paper sheets produced by different refining procedures and different PLA concentrations.

FIG. 5 shows the properties of paper sheets comprising crimped and non-crimped PLA fibers, respectively.

Figure 1:
FIG. 1 shows a process diagram of a process for manufacturing a composite article.
Figure 2:
FIG. 2 shows a further process diagram of a process for manufacturing a composite article.

It should be noted that the drawings have not been drawn to scale and that the dimensions of certain features have been exaggerated for the sake of clarity.

DETAILED DESCRIPTION

The present process for manufacturing a composite article such as a paper or paper sheet comprising a thermoplastic matrix and cellulosic fibers as described herein will provide composite articles having appropriate formation, controlled air permeability, excellent mechanical properties and excellent wet strength.

During the preparation of the composition (stock preparation), the refined cellulosic fibers and the thermoplastic fibers are mixed, pH may be adjusted and the obtained composition may be diluted with e.g. white water or water, to a concentration of 0.15%. After that the composition may be pumped to the headbox and the composition may be uniformly distributed at the forming wire. Optionally, the cellulose fibers may be never-dried wood pulp as described herein.

The forming wire may be an endless cloth of polyurethane or similar material wherein the fiber suspension may be filtrated and the thermoplastic and cellulosic fibers may be retained at the top of the wire during the dewatering, while solvent/white water passes through the permeable cloth web. Dewatering occurs by gravity and vacuum. The solids content of the wet web may be about 20% prior to being transferred to the press felt and enters the pressing section. Ultra sound equipment may be used to improve the formation and dewatering of the wet web.

The pressing section may comprise one or more presses, such as, but not limited to, roll and/or shoe presses. The main task of press section may be to increase the solids content and thereby reduce the required drying energy. Dewatering may occur by mechanical impact on the wet web and the water may be pressed out to the press felt. The drying section may comprise of a few hundred meters long drying path through a drier. Drying may be performed by hot air (150° C.), which may be heated by hot steam. The drier may comprise several levels, wherein the wet web may be transferred above the plates and hot air may be blown through narrow nozzles. Alternatively, the drying may be conducted by several hot-surfaced rolls whereby the paper web is dried by conductive heating.

After the drying step, the temperature of the obtained web may be reduced and the web may be cut into individual sheets, which may be piled up to stacks until final height of the stack has been achieved. In a following step, the stacks are pressed and bales may be produced. Alternatively to sheet, the dried composition may be transferred into small rolls.

One alternative process for providing the composition comprising fibers and cellulosic fibers to be used in the composite article comprising a thermoplastic matrix and cellulosic fibers as defined herein is to use flash drying. The composition (the stock) will be dewatered and pressed. The solids content may thereby be increased and the composition as defined hereinabove or hereinafter may be shredded and flakes may be produced. These flakes may then be transferred to a flash dryer by airflow wherein the pulp flakes may be dried in several steps. After drying, the composition flakes may enter the first press by using screw feeders wherein bales may be formed. Thereafter, the bales may be taken to a second press and thereafter packaged.

FIG. 1 shows a process for manufacturing an activated paper sheet. The composition comprising thermoplastic fibers and cellulosic fibers, which may be in the form of e.g. a sheet or a bale, is then suspended in water or other suitable solvent. The obtained suspension has a temperature of about 30° C. and a concentration of about 4 weight %, such as from 2 to 5 weight %. Additional process chemicals and fillers, such as kaolin and chalk may be added to the obtained suspension and also hydrophobic agent and other polymers may be added to increase the strength of the sheet (such as starch and CMC). Furthermore, pigments and defoaming agents and also retention agents may be added. The suspension may be purified using sieves. Solvent, such as water, may then be added to the suspension, which will have a concentration of from 0.7 to 1.5 weight %. The composition is then sprayed on the paper wire. The thickness of the paper sheet may be controlled by controlling the speed of the wire. The paper sheet may then be dewatered on a flat wire and may leave the wire with a solid content of 25%.

The heat treatment may be performed by hot pressing and may be performed on dry as well as wet paper sheets. If the pressing is performed between two hot plates, then the paper sheets have to be dried in an oven until the paper sheet is completely dry, e.g. during 15 minutes at about 105° C., this in order to avoid steam expansion and delamination in the paper sheet. Hot pressing of wet paper sheets may be performed between two steam permeable wires which will allow steam to be released from the paper sheet without causing rupturing of the web by delamination. Additionally, the press level may be adjusted and may vary during the process cycle in order to release steam and protecting structure of the sheet.

Non-limiting examples of conditions for hot pressing of one (1) dry paper sheet incorporating thermoplastic fibers with a melting point of about 170° C. are listed below.
Pressing temperature: 180±5° C.
Pressing load: >100 N/cm$^2$
Pressing time: 1 minutes If the number of paper sheets increases or if the basis weight of the paper sheets increases, then the pressing time has to be adjusted. For a stack containing multiple layers, e.g. 20 dry paper sheets with a basis weight of 240 g/m$^2$, the pressing time needs to be longer than 2 minutes, such as 7 minutes. The pressing time depends on the pressing device used and on the heat conduction from the hot plate to the web and also on the heat transfer within the paper sheet and on the composition of the paper sheet. When the pressing cycle is due, the hot pressed paper sheets are cooled down. Optionally, the paper sheets may be stacked together in wet condition, hence using steam permeable wires that allow evacuation of steam from the composite article.

Paper sheets with higher moisture content require longer pressing time. Pressing sequences with different pressure levels and pressing temperatures might be used in order to reduce the pressing time or to achieve particular sheet properties.

Crimp Measurement:

The equipment used were: Ruler (mm), Tweezers (2 pair), Specimen Board (velveteen covered board), Magnifier with light, Tape Ruler (mm) on black velveteen board, Crimp Conversion Chart.

The procedure was the following: 10 clumps of fibers from samples were randomly selected and placed on black/white specimen board. Tweezers were used for removing 1 fiber from a clump of fiber. The number of primary crimp in fiber was counted and recorded. Using same filament, one tweezers was placed on zero and carefully measured and the relaxed length was recorded. This was a relaxed stage with all the primary crimp intact, secondary crimp was removed. Using same filament, one end of filament was hold with tweezers on zero and the other end was carefully extended with the tweezers in order to remove all crimp without stretching filament. The extended length was measured to the nearest mm.

The calculation was performed accordingly:
Staple length or extended length: The sum of extended lengths was divided by number of results to get average extended length or average staple length (convert to inches by dividing average extended length (mm) by 25.4)
Crimp per inch: The average of crimps was divided by average extended length
Crimp angle: The average of relaxed lengths was divided by (mm) average of extended lengths (mm) and a crimp angle table was used to get crimp angle.

Figure 3:
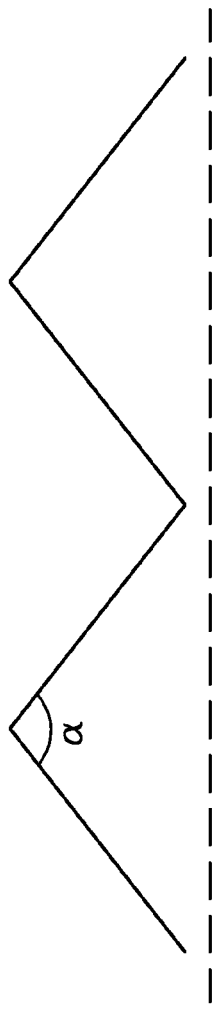
FIG. 3 shows the crimp angle α of a fiber.

FIG. 3 shows the waviness of a fiber. The fiber is depicted as continuous line. The fiber has a crimp angle α.

FIG. 4 shows the properties of paper sheets manufactured by three different refining procedures and three different PLA concentrations. The physical testing was performed as described in Example 2 below. The formation was measured as described in this document.

The three different PLA concentrations refer to aqueous suspensions of PLA having a concentration of 10 weight %, 20 weight % and 30 weight %. The procedure denominated "Pulp mill" refers to the trial where the refining was performed only on cellulosic pulp during the production of the pulp/PLA mixture, while "Paper mill" refers to the trial where the refining was performed only on the pulp/PLA mixture.

Pulp Mill:

The procedure denominated "Pulp mill" refers to refining of never-dried softwood kraft pulp at a concentration of 4 weight % after which it is mixed with an aqueous solution of PLA fibers.

Dry 4 mm PLA fibres were used and diluted in the water where 4% suspension of PLA fibres was produced. Similarly the 4% pulp suspension was produced of a never dried cellulose pulp. The refining was performed only with cellulose pulp at the laboratory refiner LR 40. Energy input for refining was 100 kWh/t.

The suspensions were mixed in a blender and dewatered by centrifugation. The whole wet mixture was first transformed to form approximately 1 cm wide flings which were stored in a large drying basket so that the layer of fling was 5 cm high. The basket with fling-pulp was then placed in a drying chamber and dried. Drying of fling pulp in the drying chamber was performed with the hot air at 90° C. and 50% Rh. The hot air was circulated within the drying chamber and the temperature and the Rh were controlled automatically. The hot air was blown from underside of the drying chamber, passing through the basket and wet pulp/PLA flings. The drying was ongoing until the moisture content of the pulp/PLA mixture was reduced to 10%. After drying the pulp/PLA mixture was disintegrated in the water to consistency of 4% and the wet paper sheets were produced at Finnish sheet former according standard procedure described in SCAN-CM 26:99. The basis weight of produced paper sheets with dimension 16.5×16.5 cm were 100 g/m². The wet paper sheets were pressed between two blotters to a solids content about 40-50% depending on refining and swelling. Wet pressed paper sheets were dried restrained at 23° C. and 50% Rh 48 hours and after that prepared for hot pressing. Prior the hot pressing the paper sheets were dried 15 minutes in an oven at 105° C. After this drying the sheets were pressed in 7 minutes in a plane press at a temperature of 180° C. and pressure of 200 N/cm². The "activated" paper sheets with melted PLA were cold down and left in a testlab at 23° C. and 50% Rh until they were analysed.

Paper Mill:

Dry 4 mm PLA fibres was used and diluted in water there 4% suspension of PLA fibres were produced. Similarly the 4% pulp suspension was produced of a never-dried cellulose pulp.

The suspensions were mixed in a blender and dewatered by centrifugation. The whole wet mixture was first transformed to form approximately 1 cm wide flings which were stored in a large drying basket so that the layer of fling was 5 cm high. The basket with fling-pulp was then placed in a drying chamber and dried. Drying of fling pulp in the drying chamber was performed with the hot air at 90° C. and 50% Rh. The hot air was circulated within the drying chamber and the temperature and the Rh were controlled automatically.

The hot air was blown from underside of the drying chamber, passing through the basket and wet pulp/PLA flings. The drying was ongoing until the moisture content of the pulp/PLA mixture was reduced to 10%.

After drying the pulp/PLA mixture was disintegrated in the water to consistency of 4% and the whole mixture was refined at the laboratory refiner LR 40. Energy input for refining was 100 kWh/t.

After refining the PLA/pulp suspension was diluted and the wet paper sheets were produced at Finnish sheet former according standard procedure described in SCAN-CM 26:99. The basis weight of produced paper sheets with dimension 16.5×16.5 cm were 100 g/m². The wet paper sheets were pressed between two blotters to a solids content about 40-50% depending on refining and swelling. Wet pressed paper sheets were dried restrained at 23° C. and 50% Rh 48 hours and after that prepared for hot pressing. Prior the hot pressing the paper sheets were dried 15 minutes in a oven at 105° C. After this drying the sheets were pressed in 7 minutes in a plane press at a temperature of 180° C. and pressure of 200 N/cm². The "activated" paper sheets with melted PLA were cooled down and left in a testlab at 23° C. and 50% Rh until they were analysed.

The process to be used will depend on the desired properties of the paper sheet. For instance, when high wet strength is desired the Pulp mill procedure may be used in combination with a PLA concentration of 10 weight %.

FIG. 5 shows the properties of a paper sheet manufactured in accordance with Example 2 described herein. Crimped and non-crimped fibers were used, respectively. Contrary to expectation, the paper sheet comprising crimped PLA fibers exhibited substantially the same properties as the paper sheet comprising non-crimped, i.e. straight, PLA fibers.

Further Aspects

Also the present disclosure relates to a process for manufacturing a paper sheet comprising a thermoplastic matrix and cellulose pulp fibers and to paper sheets manufactured by said process. The process comprises the following steps:
a) refining pulp;
b) mixing the refined pulp from step a) with non-refined thermoplastic fibers;
c) dewatering the obtained composition from step b);
d) drying the obtained composition from step c);
e) suspending the obtained composition from step d) in a solvent;
f) forming the composition obtained from step e) into a paper sheet and drying; and
g) heating the obtained paper sheet from step f) to the melting temperature of the thermoplastic fiber.

The paper sheet obtainable by the process as defined hereinabove or hereinafter has adequate formation, wet strength and controlled air permeability. It has surprisingly been found that the magnitude of these properties may be determined by selecting the degree of refining. Additionally, it has surprisingly been found that the homogeneity of the composition as defined hereinabove or hereinafter is better if the crimp angle is high and crimp number is low.

Furthermore, in the process for manufacturing a paper sheet comprising a thermoplastic matrix and cellulose pulp fibers as defined hereinabove or hereinafter, step d) may comprise both drying the composition obtained from step c) or forming the composition obtained from step c) into a sheet and drying said sheet. The solvent used in step e) may be selected from water. According to the present disclosure, it is also possible to dry the composition as flakes and these flakes are then formed into a bale.

The process for manufacturing a paper sheet comprising a thermoplastic matrix and cellulose pulp fibers as defined hereinabove or hereinafter may comprise an additional step which is that the composition obtained from e) is refined before it is formed into a paper sheet and dried. Optionally, step g) comprise that the paper sheet obtained from step f) may be heated and pressed at the same time.

Additionally, the thermoplastic fibers may have a length of from 2 to 6 mm and said a crimp angle which is 98° or more.

The present invention is further illustrated by the following non-limiting examples.

EXAMPLES

Abbreviations kg kilogram
m³ cubic meter
rpm revolutions per minute
kWh kilowatt hour
mm millimeter
J/m joule/meter
LDPE low-density polyethylene
LLDPE linear low-density polyethylene
MDPE medium-density polyethylene
HDPE high-density polyethylene
TEA tensile energy adsorption
TSI tensile stiffness index
Nm/g Newton meter per gram mNm²/g milli Newton square meter per gram
μm/Pas micro meter per Pascal second
kPa kilopascal
kJ/kg kilo Joule per kilogram
MNm/kg mega Newton meter per kilogram
Log 10 decimal logarithm
dtex linear mass density of a textile fibre, which is defined as the mass in grams per 10 000 meters
CTMP Chemi-Thermo-Pechanical Pulp
TMP thermomechanical pulp
Rh relative humidity
RH relative humidity Example 1—Manufacture of a Paper Sheet PLA fibers denominated Trevira D260 were purchased from Trevira GmbH, Hattersheim, Germany.

Never-dried softwood kraft pulp was washed and refined in a Voith LR40 disk refiner at a concentration of 4 weight %. Specific refining energy was ranged from 0 to 150 kWh/ton and specific edge load was 2 J/m. After refining, the pulp slurry was mixed with from 0 to 50% PLA fibers (0 means that the slurry comprised cellulosic fibers only and this sample was used as reference sample) and dried at 90° C. and 50% RH until a 90% solid content was obtained. In this document, RH or Rh stands for relative humidity. After drying, small flake bales were made by compressing the dry composition comprising cellulosic fibers and coated PLA fibers into a steel mold (10×20 cm) having in the 14-ton press and the latter with 35-ton press.

The bale was dissolved in water and refined again in a Voith LR40 disk refiner at a concentration of 4 weight %. Prior to the refining, the pulp was disintegrated by circulating for 10 minutes with no load. The refining was adjusted to a specific refining energy of from 0 to 200 kWh/ton and the specific edge load was 2 J/m.

All paper sheets (pulp mill and paper mill refined) were made in a Finnish sheet former according to ISO 5269-1. Before the paper sheets were produced, the composition comprising the cellulosic fibers and coated PLA fibers was disintegrated in a pulper at 30 000 rpm at a concentration of 3%. After pulping, the composition was diluted and the appropriate amount was added to the sheet form, wherein wet sheets (16.5×16.5 cm) having a basis weight of 100 g/m² were produced. The wet sheets were covered and removed from the paper wire. After the forming, the wet sheets were pressed in two rounds of 400 kPa (5.2 and 2.2 minutes) between blotters that were exchanged to dry blotters between pressings. The solids content of wet paper sheet after pressing varied and was from 50 to 60 weight %. These paper sheets were dried for at least 3 days in a conditioned room at 23° C. and 50% RH.

After drying at room conditions, the paper sheets were dried in an oven in 15 minutes at 105° C. followed by hot pressing in a plane press at temperature 180° C. and pressure 200 N/cm². The obtained paper sheets comprising cellulosic fibers and a thermoplastic matrix were cooled in room temperature.

Paper sheets comprising cellulose pulp fibers and polylactide (PLA) matrix were used for physical testing.

Physical testing was conducted according to standard procedures for paper testing. The thickness was determined according to the standard EN20534. Measurements were carried out with a precision micrometer with a static pressure of 100 kPa and on a surface of 200 mm². With these data and the sample weight and surface density was calculated, and the paper grammage. Tear strength was made with Lorentzen & Wettre tester in accordance with standard method EN 21 974 which used samples 62×40 mm. Tensile strength (tensile index, TSI, TEA, elongation at break (stretch)) in accordance with ISO 1924-3, within 15 mm paper strips were analyzed by strain rate 100 mm/min and the distance between the clamps was 100 mm. The wet strength measurements were made according to EN 12625-5 with 10 strips and a Roel Zwick tensile tester. Soaking the samples was performed during 15 sec, elongation was 50 mm/min and the distance between the clamp and the rod was 50 mm. The air permeability was determined in accordance with ISO 5636-5 (Gurly). Water retention value WRV, was measured according to SCAN-C 62:00, wherein 2 g of bone dry pulp were centrifuged for 10 minutes in 10 000 rpm. Z-strength was analyzed according to SCAN P90. Folding strength and folding endurance (Köhler-Molin) were analyzed according to ISO 5626:1993 and beta formation according to the FA 11 701.

The invention claimed is:

1. A process for manufacturing a composite article comprising cellulose pulp fibers and a thermoplastic matrix, wherein said process comprises the steps of:
   a) mixing a refined aqueous pulp suspension with a water suspension of crimped non-refined thermoplastic fibers into a composition,
   b) forming the composition into a fiber web,
   c) dewatering the fiber web,
   d) drying the fiber web, and
   e) heating and pressing the dried fiber web from step d) to melt said crimped non-refined thermoplastic fibers into a thermoplastic matrix and form a composite article.

2. A process according to claim 1, wherein the aqueous pulp suspension has a concentration from 0.1 weight % to 4 weight %.

3. A process according to claim 1, wherein the pulp of the pulp suspension is wood pulp.

4. A process according to claim 1, wherein the pulp of the pulp suspension is never-dried wood pulp.

5. A process according to claim 4, wherein the never-dried wood pulp is never-dried softwood pulp.

6. A process according to claim 1, wherein the water suspension of the crimped non-refined thermoplastic fibers has concentration from 2 to 5 weight %.

7. A process according to claim 1, wherein the crimped non-refined thermoplastic fibers are fibers of a crimped non-refined thermoplastic selected from the group consisting of a polyolefin, a polyester, a polycarbonate, a polyvinyl and a copolymer or mixture thereof.

8. A process according to claim 7, wherein the crimped non-refined thermoplastic fibers comprises fibers of the polyolefin, wherein the polyolefin is selected from the group consisting of polyethylene and polypropylene.

9. A process according to claim 7, wherein the crimped non-refined thermoplastic fibers comprises fibers of the polyester, wherein the polyester is selected from the group consisting of polyhydroxybutyrate (PHB) and polylactic acid (PLA).

10. A process according to claim 1, wherein the crimped non-refined thermoplastic fibers are PLA fibers.

11. A composite article made by the process of claim 1.

12. A composite article according to claim 11, characterized in that said composite article has a formation of from 6 to 14, an air permeability from 10 to 250 μm/Pas, and a wet strength equal to or above 2 Nm/g.

13. A composite article according to claim 11, wherein said composite article comprises from 5 to 70 weight % of the thermoplastic matrix.

14. A composite article according to claim 13, wherein said composite article comprises from 10 to 30 weight % of the thermoplastic matrix.

15. A composite article according to claim 11, wherein the thermoplastic matrix is a PLA matrix.

16. A composite article according to claim 11, wherein the composite article is present in a label, a billboard, a paper board, a fiber board, a furniture, a container, a food container, a laminate, a package or a composite.

17. A product comprising a composite article manufactured in accordance with claim 1.

18. A process for manufacturing a composite article comprising cellulose pulp fibers and a thermoplastic matrix, wherein said process comprises the steps of:
 a) mixing a refined aqueous pulp suspension with a water suspension of non-refined thermoplastic fibers into a composition,
 b) dewatering the composition into a composite material,
 c) drying the composite material,
 d) suspending the composite material in water,
 e) forming the composite material obtained from step d) into a fiber web and drying said fiber web, and
 f) heating and pressing the fiber web from step e) to melt said thermoplastic fibers into a thermoplastic matrix and form a composite article.

19. A process according to claim 18 further comprising a refining step between the step of suspending the dried composite material in water and the step of forming the composite material into a fiber web and drying said fiber web.

20. A process for manufacturing a composite article comprising cellulose pulp fibers and a thermoplastic matrix from a composite material that has been formed by the steps of:
 mixing a refined aqueous pulp suspension with a water suspension of non-refined thermoplastic fibers into a composition,
 dewatering the composition into a composite material, and
 drying the composite material,
 wherein said process comprises the steps of:
  a) suspending the dried composite material in water,
  b) forming the composite material obtained from step a) into a fiber web and drying said fiber web, and
  c) heating and pressing the fiber web from step b) to melt said thermoplastic fibers into a thermoplastic matrix and form a composite article.

* * * * *